United States Patent [19]

Preis

[11] Patent Number: 5,703,765
[45] Date of Patent: Dec. 30, 1997

[54] FLYBACK CONVERTER HAVING A REGULATED OUTPUT VOLTAGE

[75] Inventor: Josef Preis, München, Germany

[73] Assignee: Siemens Aktiengesellschaft, Munich, Germany

[21] Appl. No.: 676,353
[22] PCT Filed: Jan. 17, 1995
[86] PCT No.: PCT/EP95/00163
  § 371 Date: Jul. 18, 1996
  § 102(e) Date: Jul. 18, 1996
[87] PCT Pub. No.: WO95/20261
  PCT Pub. Date: Jul. 27, 1995

[30] Foreign Application Priority Data

Jan. 20, 1994 [EP] European Pat. Off. ............ 94100822.9

[51] Int. Cl.$^6$ ........................................ H02M 3/335
[52] U.S. Cl. ........................................ 363/21; 363/97
[58] Field of Search ........................ 363/20, 21, 95, 363/97, 98, 131, 132; 323/902

[56] References Cited

U.S. PATENT DOCUMENTS

| | | | |
|---|---|---|---|
| 4,868,729 | 9/1989 | Suzuki | 363/21 |
| 4,996,638 | 2/1991 | Orr | 363/21 |
| 5,173,847 | 12/1992 | Suzuki | 363/21 |
| 5,282,122 | 1/1994 | Summer | 363/21 |
| 5,301,095 | 4/1994 | Teramoto et al. | 363/21 |
| 5,479,087 | 12/1995 | Wright | 323/267 |
| 5,508,904 | 4/1996 | Hara | 363/21 |

FOREIGN PATENT DOCUMENTS

| | | |
|---|---|---|
| 0 420 074 | 4/1991 | European Pat. Off. . |
| 36 27 858 | 2/1988 | Germany . |
| 40 21 385 | 1/1992 | Germany . |

OTHER PUBLICATIONS

Patent Abstracts of Japan, "Auxiliary Power Circuit for Switching Regulator", Toyoda Masashi, vol. 13, no. 117, JP63287364, Mar. 22, 1989

Primary Examiner—Adolf Berhane
Attorney, Agent, or Firm—Hill, Steadman & Simpson

[57] ABSTRACT

Flyback converter has a regulating arrangement which is connected to an output and whose duty ratio is limited to a predetermined upper limit. A series circuit has a diode and an RC series circuit is connected to the rectifier diode of the main circuit (3) on the secondary side in order to supply the regulating arrangement with an auxiliary voltage which is greater than the output voltage. A further diode (44) leads from the series circuit to an output (a) of the auxiliary circuit (4). The flyback converter is suitable in particular for supplying ASICs, which require a relatively low supply voltage.

19 Claims, 3 Drawing Sheets

FLYBACK CONVERTER HAVING A REGULATED OUTPUT VOLTAGE

BACKGROUND OF THE INVENTION

The invention relates to a flyback converter.

Such a flyback converter is already known from the book by Joachim Wüstehube: "Schaltnetzteile: Grundlagen, Entwurf, Schaltungsbeispiele [Switch-mode power supplies: Fundamentals, Design, Circuit examples]", expert-verlag 1979, pages 87 to 91.

Conventional flyback converters have a transformer which absorbs energy during the time in which a power switch, which is located in the main circuit on the primary side, is switched on and emits energy to the main circuit on the secondary side at least during the part of the phase in which the power switch is switched off.

The output voltage of the flyback converter is a DC voltage whose magnitude is a fraction of the amplitude of the pulsed voltage on the secondary side. The control range of the power switch is frequently limited to a duty ratio of 0.5.

Furthermore, the reference elements which can be used as regulators are known from the book "Motorola Linear and Interface Integrated Circuits", 2nd Edition, 1988, pages 5–17 to 5–24. Such reference elements have a reference-ground voltage connection, an actual value input and a control voltage output.

The output voltage of a flyback converter can be regulated at a constant value with the aid of a regulating arrangement. However, difficulties can arise in this case when it is intended to produce a comparatively low output voltage with the aid of the flyback converter. If the regulating output voltage emitted from the flyback converter is not sufficient to be used as the auxiliary voltage for the regulating arrangement, then the required auxiliary voltage must be produced in addition to the regulated output voltage.

If the flyback converter, per se, has no suitable output circuit, then such an auxiliary voltage can be produced by means of a winding which is additionally fitted on the transformer core. This requires a transformer with increased complexity in terms of windings, and an increased requirement for winding space which, furthermore, can also lead to thermal problems in the case of the transformer.

Another option is to use an auxiliary voltage of another existing converter as the auxiliary voltage. However, when two converters are coupled in such a manner, difficulties can arise in terms of the constancy of the auxiliary voltage when the current of the additional converter is limited, or in the time sequencing of the running up of the auxiliary voltage and output voltage of the flyback converter.

SUMMARY OF THE INVENTION

The object of the invention is thus to design a flyback converter having a regulated output voltage in such a manner that the auxiliary voltage is produced with little complexity in the flyback converter itself.

Considerations in the context of the invention have shown that a square-wave voltage is available on the rectifier diode of the main circuit on the output side, the amplitude of the square-wave voltage in the case of a flyback converter of conventional design is approximately double the regulated DC output voltage and that, taking account of the comparatively low current load on the auxiliary voltage source, an auxiliary voltage which is required for a regulating arrangement can be obtained from this square-wave voltage with the aid of an auxiliary circuit.

In general terms the present invention is a flyback converter having an electronic switch which is connected in series with a primary winding of a transformer in a main circuit on the primary side and can be controlled by a control device. On the secondary side it has a main circuit which is connected to a secondary winding of the transformer. It contains a first diode in a series path and an energy-storage capacitor in a subsequent parallel path, connected in parallel with the output in the transformer. It has a regulating arrangement which is connected to an output of the flyback converter and is supplied with an auxiliary voltage. The duty ratio of the control voltage which controls the electronic switch is limited to a predetermined upper limit. The input of an auxiliary circuit is connected tot he rectifier diode of the main circuit on the secondary side and one pole of its output is connected to its input. The auxiliary circuit contains an RC series circuit in a series path on the input side, a second diode in the downstream parallel path, a third diode in a series path following the parallel path, and a capacitor in parallel with the output. An auxiliary voltage input of the regulating arrangement is supplied with an auxiliary voltage which is the sum of the output voltage of the flyback converter and the output voltage of the auxiliary circuit. The second diode is polarized such that the second diode is reverse biased when the first diode is forward biased. The third diode is polarized such that it is reverse biased when the second diode is forward biased. In this case, an auxiliary voltage which is derived from a voltage occurring in the output circuit to be regulated is stepped up to the regulated output voltage and the desired supply voltage is thus obtained as the sum voltage of the output voltage and the auxiliary voltage.

The measures according to the invention result in an advantageous manner in a flyback converter in which both a comparatively low regulated output voltage for a relatively low load current and an auxiliary voltage. which is larger in comparison therewith, for a comparatively low current requirement are produced with particularly little complexity and high reliability.

Advantageous developments of the present invention are as follows.

The limit of the duty ratio is at least approximately 0.5.

A zener diode is arranged in parallel with the output of the auxiliary circuit.

The supply voltage input of a regulator of the regulating arrangement is connected to the auxiliary voltage input of the regulating arrangement.

The light-emitting diode of an optocoupler is connected to the output of the regulating arrangement. A series circuit which has the light-emitting diode of the optocoupler and a resistor is connected to the auxiliary voltage input of the regulating arrangement.

The regulator is formed by a reference element. The control voltage output of the reference element is connected via a resistor tot he auxiliary voltage input of the regulating arrangement.

The output voltage of the flyback converter is less than 5 V, and the auxiliary voltage is at least 5V.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
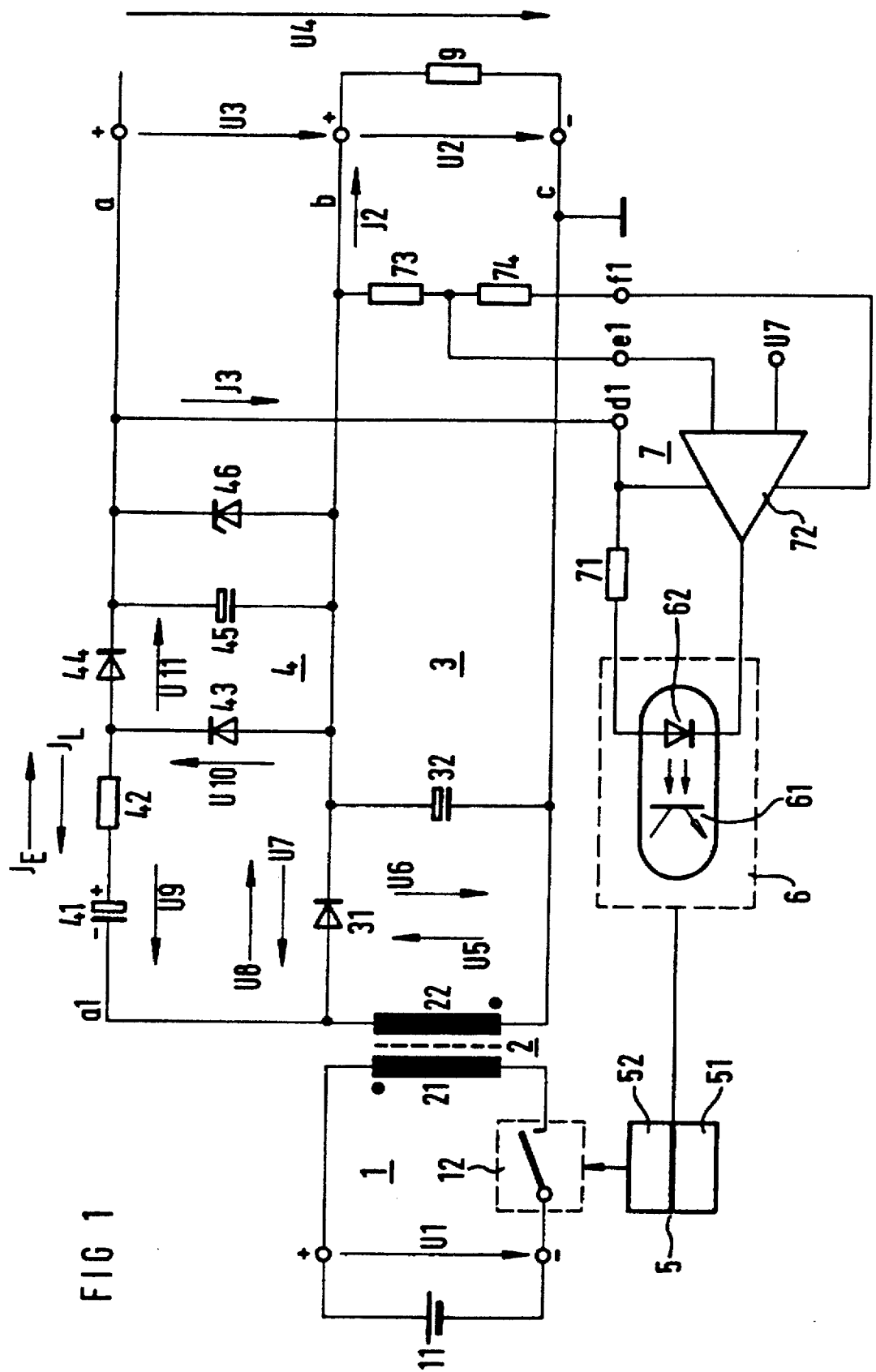
FIG. 1 shows a flyback converter having a regulating circuit which contains an operational amplifier and FIG. 2 shows a flyback converter having a regulating arrangement which contains a reference element.

In the case of the circuit arrangement which is shown in FIG. 1, the electrical load 9 is connected to the output b, c of the flyback converter. This load 9 is, in particular, an ASIC, that is to say an application-specific integrated circuit, which requires a supply voltage of less than 5 V.

The main circuit 1 on the primary side runs from the input for the DC voltage U1 of the DC voltage source 11, via the primary winding 21 of the transformer 2 and the electronic switch 12 which is connected in series therewith.

The main circuit 3 on the secondary side runs from one end of the secondary winding 22 of the transformer 2, via the rectifier diode 31, to an output connection b. The energy-storage capacitor 32, on which the DC voltage U2 occurs, is located in a parallel path downstream of the rectifier diode 31. The other end of the secondary winding 22 is connected to reference-ground potential, like the other output connection c.

The electronic switch 22 is, in particular, a field-effect transistor as a power switch. The electronic switch 12 is controlled to switch on periodically with the aid of the clock-controlled control device 5 and switching-on pulses and forms the control element of a regulating path. The duty ratio of the control voltage which controls the electronic switch 12 is limited to a predetermined upper limit. The upper limit of the duty ratio of the control voltage is preferably approximately 0.5. In this case, the duty ratio is understood to mean the ratio of the pulse duration to the period duration.

As a result of the finite voltage drop, which is not negligible, on the light-emitting diode 62 of the optocoupler 6, and taking account of the supply voltage which is required from the regulator 72, which is formed by an operational amplifier, the output voltage U2 of the flyback converter is not sufficient to be used as the auxiliary voltage for the regulating arrangement 7.

The auxiliary circuit 4 is connected to the rectifier diode 31 of the main circuit 3 on the secondary side. The auxiliary circuit 4 contains the series circuit which comprises the capacitor 41, the resistor 42 and the diode 43 and is connected in parallel with the diode 31. The RC series circuit 41, 42 and the diode 43 are connected in series with one another in this series circuit. In this case, opposite polarity connections of the diodes 31 and 43 are connected to one another. This results in the diode 43 being reverse biased when the diode 31 is forward biased.

The junction point between the diode 43 and the RC series circuit 41, 42 is connected via the diode 44 and the capacitor 45, which is in series with it, to the junction point of the diodes 31 and 41. The junction point of the two diodes 31 and 43 is connected to the connection b, which is both the input connection and the output connection of the auxiliary circuit 4. The diode 44 is polarized in such a manner that opposite polarity connections of the diodes 43 and 44 are connected to one another. This results in the diode 44 being reverse biased as soon as the diode 43 is forward biased.

The capacitor 45 is connected in parallel with the output a2, b of the auxiliary circuit 4. One connection of the capacitor 45 is connected to the connection b, which carries the voltage U3 with respect to reference-ground potential, of the converter output b, c. The other connection a2 carries the auxiliary voltage U3 with respect to the connection b and the supply voltage U4 with respect to the reference-ground potential at the output connection c of the main circuit 3 on the secondary side.

The zener diode 46 is connected in parallel with the capacitor 45, forms, together with the resistor 42, a device for voltage stabilization and limits the voltage U3 on the capacitor 45 to a predetermined value. The meanings of symbols in FIG. 1 are:

| | |
|---|---|
| U1 | the input voltage of the flyback converter, |
| U2 | the DC voltage at the output b, c, |
| U3 | the output voltage of the auxiliary circuit 4, |
| U4 | the supply voltage for the regulating arrangement 7, |
| U5 | the amplitude of the pulsed voltage on the secondary winding 22 when the switch 12 is switched on, |
| U6 | the amplitude of the pulsed voltage on the secondary winding 22 when the switch 12 is switched off, |
| U7 | the pulsed voltage on the rectifier diode 31, |
| U8 | the forward-biased voltage of the rectifier diode 31, |
| U9 | the voltage on the capacitor 41, |
| U10 | the voltage on the forward bias diode 43 and |
| U11 | the voltage on the forward bias diode 44. |
| IL | the load current flowing through the resistor 42, |
| IE | the discharge current flowing through the resistor 42, and |
| R42 | the resistance of the resistor 42. |

The supply voltage U4 is formed by also using the output voltage U2 which is to be regulated, to be precise by addition of the auxiliary voltage U3 to the output voltage U2.

The transformer 2 has the transformation ratio, $$u'' = \frac{w2}{w1} \approx \frac{u2}{u1_{min}}$$

where w1 is the number of turns on the primary winding 21, w2 is the number of turns on the secondary winding 22, and $U1_{min}$ is the minimum value of input voltage U1.

During the phase in which the transistor 12 is switched on, a voltage pulse having the amplitude U5=U1 u is produced on the secondary of the transformer 2. The diode 31 prevents this voltage pulse having any effect in the power circuit 3, that is to say in the main circuit on the secondary side. The voltage on the diode 31 is in this case U5+U2.

The capacitor 41 is charged by the charging current iL to the voltage U9=U5+U2−U10, via the diode 43 and the resistor 42.

A voltage $U9 \geq 2 \cdot U2$ and $I_L \approx I_e \geq 2 \cdot I3$ results in the case of a design of the flyback converter for a duty ratio of $\gamma \leq 0.5$.

In addition, during the phase in which the transistor 12 is switched on, the storage transformer 2 absorbs energy corresponding to the output power required by the load resistor 9. When the transistor 12 switches off, then the storage transformer 2 emits its energy at the output b, c. In doing so, a load current flows via the diode 31.

The voltage U6=U2+U8 is present at the anode of the diode 31 during the phase in which the transistor 12 is switched off. The voltage U9 on the capacitor 41 is added to this value, and the current $I_E$ flows in the capacitor 45. In this case, $$I_E = \frac{U2 + U8 + U9 - (U2 + U3 + U11)}{R_{42}}$$

where R42 is the resistance of the non-reactive resistor 42. This results in the auxiliary voltage $$U3 = U9 + U8 - U11 - I_E \cdot R42$$
$$= U1 \cdot u + U2 + U8 - U10 - U11 - I_E \cdot R42,$$

where $I_E$ is the discharge current for the capacitor 41.

The auxiliary voltage U3 depends on the current drawn $I3 \approx I_E$ and the input voltage U1. The auxiliary voltage U3 can be limited, if required, with the aid of the zener diode 46, R42 acting as a bias resistor.

As investigations in the context of the invention have shown, the auxiliary voltage U4 runs up earlier than the output voltage U2 to be regulated. This ensures the early supply of the regulator 72 of the converter according to FIG. 1 or of the reference element 86 of the converter according to FIG. 2 and the optocoupler diode 62 at the start of the regulating process, as well as an adequate voltage reserve for the regulation. The auxiliary circuit 4 enables regulation in an advantageous manner of small output voltages U2 with the aid of an auxiliary voltage, which is produced from a voltage of the output circuit, in the case of independent and defined regulator characteristics, this being achieved with a comparatively low requirement for components.

The voltage U4 is limited to the zener voltage of the zener diode 46 by means of said zener diode 46 and the resistor 42. The zener voltage is dimensioned such that the connected voltage regulator is protected against excessively high operating voltage. It preferably carries no current in the range of small to medium input voltages. The magnitude of the voltage U3 which is added to the output voltage U2 corresponds approximately to the output voltage U2, that is to say an auxiliary voltage U4 is available, which is approximately equal to double the output voltage U2.

An arrangement for actual value formation is connected to the output of the flyback converter. This arrangement includes a voltage divider which is connected between the output connections b and c and comprises the resistors 73 and 74. Part of the output voltage U2 is tapped off at the tap on the non-reactive voltage divider 73, 74 and is supplied to the actual value input e1 of the regulating arrangement 7.

The regulating arrangement 7 is thus connected via the voltage divider 73, 74 to the output b, c of the flyback converter.

The auxiliary voltage input d1, f1 of the regulating arrangement 7 is connected to the output a, c of the series circuit which is formed from the outputs of the auxiliary circuit 4 and of the main circuit 3 on the secondary side.

The supply voltage input of the regulator 72 is connected to the auxiliary voltage input d1, f1 of the regulating arrangement 7. The regulator 72 of the regulating arrangement 7 is connected by its inverting input to the reference voltage U7 and by its non-inverting input to the actual value input e1.

The series circuit which comprises the resistor 71 and the light-emitting diode 62 of the optocoupler 6 is connected between the output of the regulator 72 and the auxiliary voltage input d1 of the regulating arrangement 7.

Figure 2:
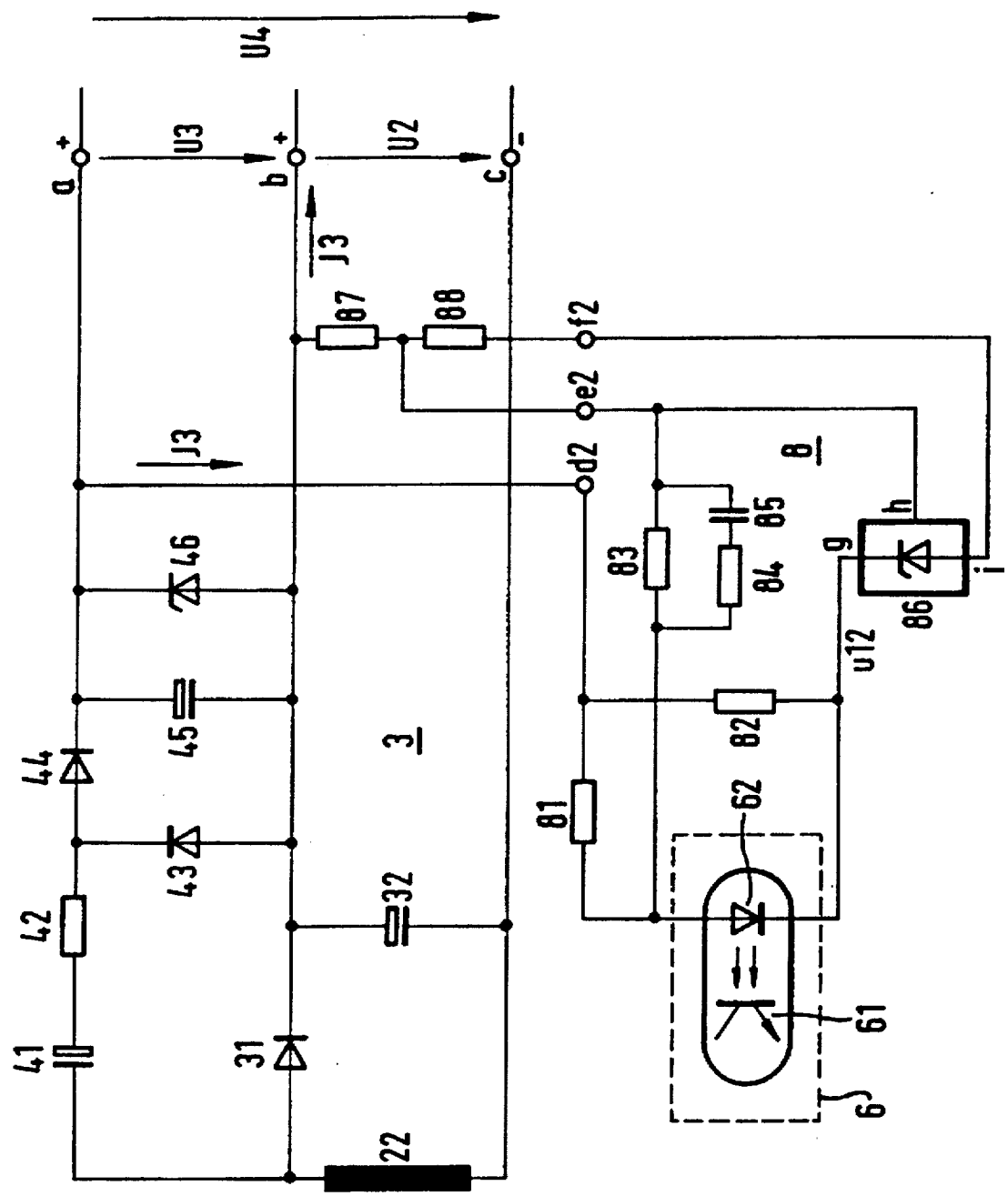

The flyback converter which is shown in FIG. 2 corresponds largely to that according to FIG. 1. The regulating arrangement 8 is provided, as a difference, instead of the regulating arrangement 7. The regulator of the regulating arrangement 8 is formed by the reference element 86.

The reference element 86 is a commercially available integrated circuit, for example of the TL 431 Type from Motorola, to be precise a three-pole integrated circuit which, like an operational amplifier with an integrated reference voltage source, operates with a high-stability reference voltage of, for example, 2.49 V. Such a regulator has a reference-ground voltage connection I, an actual value input h and a control voltage output g. The regulator 86 includes a reference voltage source and emits the control voltage U12 at the control voltage output g.

The voltage divider, which comprises the resistors 87 and 88, is connected to the output of the main circuit on the secondary side. The junction point of the resistors 87 and 88 is connected to the actual value input e2 of the regulating arrangement 8. The actual value input h of the reference element 86 is connected to the actual value input e2 of the regulating arrangement 8.

The control voltage output g of the reference element 86 is connected via the resistor 82 to the auxiliary voltage input d2 of the regulating arrangement 8. The series circuit which comprises the resistor 81 and the light-emitting diode 62 of the optocoupler 6 is connected in parallel with the resistor 82. The two-pole network which comprises the resistor 83 and the RC element 84, 85 arranged in parallel with it is connected between the actual value input e of the regulating arrangement and the light-emitting diode 62.

The control voltage output g of the regulator 86 is connected via the optocoupler 6 to the A/D converter 51, which is followed by the control section 52 for controlling the electrical switch 12.

The regulating arrangement 8 regulates the output voltage U2 of the flyback converter such that the voltage U12 is equal to the internal reference voltage URef of the reference element 86.

The supply voltage of the voltage reference element 86 is greater than the sum of the reference voltage U12 and the voltage drop on the light-emitting diode 62 of the optocoupler 6. Thus, particularly in the case of a reference element 86 having a reference voltage of 2.5 V, it is no longer possible to operate with an output voltage U2 of less than 5 V without an additionally produced auxiliary voltage.

Figure 3:
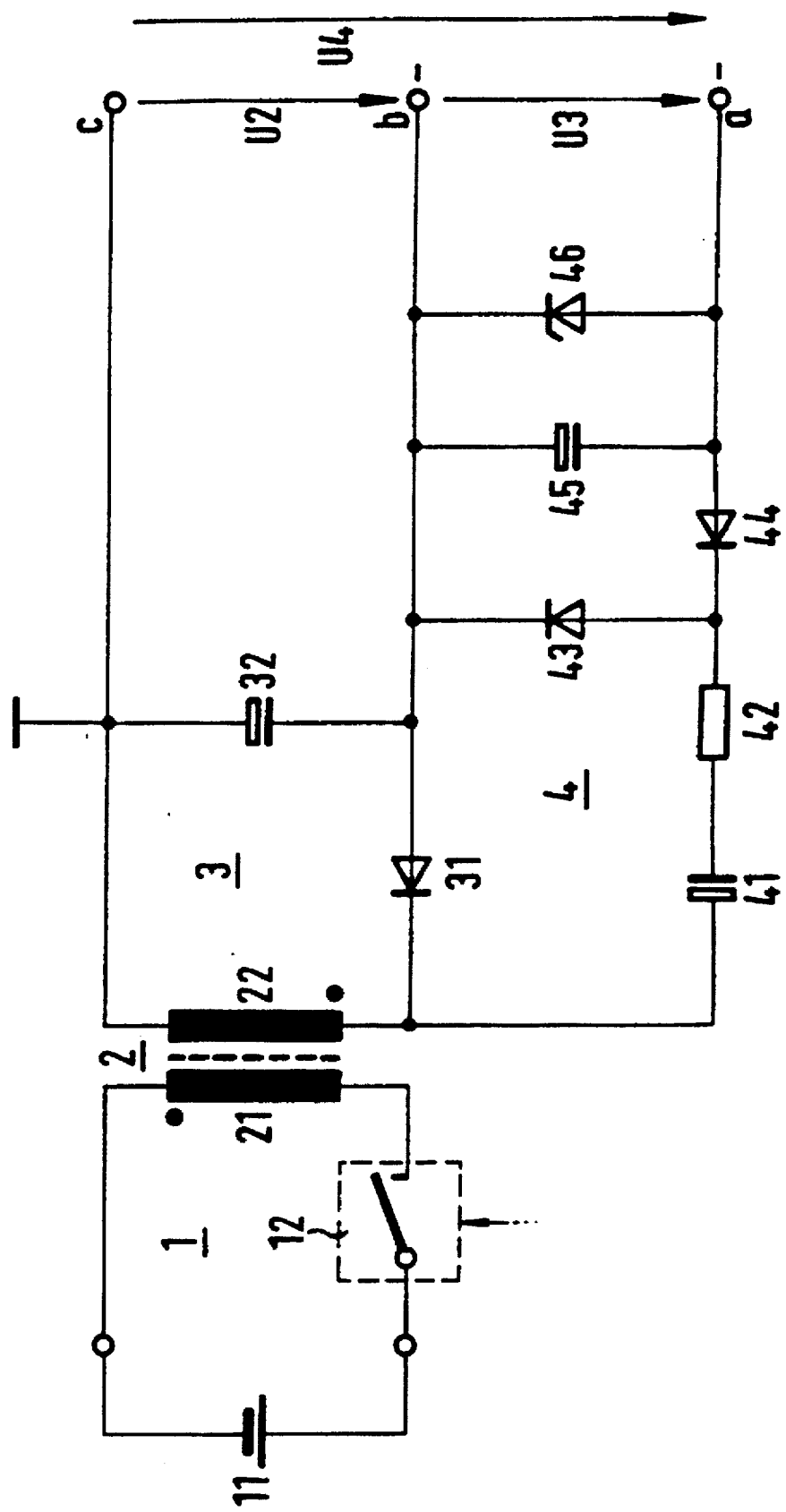
FIG. 3 shows a flyback converter having a negative output voltage.

FIG. 3 shows a circuit arrangement having a flyback converter in which the positive pole of the output is connected to reference-ground potential. The end of the secondary winding 22 is connected to the output connection c, which is at reference-ground potential. As a difference from FIGS. 1 and 2, the rectifier diode 31 of the main circuit 3 on the secondary side is connected to the start of the secondary winding 22.

The design of the auxiliary circuit 4 corresponds to that of the auxiliary circuits according to FIGS. 1 and 2. Once again, the diodes 31, 43 and 44 are connected in series, in the same polarity. A difference from FIGS. 1 and 2 is that the rectifier diode 31 of the main circuit 3 on the secondary side is connected by its cathode to the start of the secondary winding 22. In the case of this arrangement, the auxiliary voltage U4, which is negative with respect to reference-ground potential, is produced at the output connection a.

The flyback converters which are shown in FIGS. 1 to 3 are preferably designed such that the output voltage U2 is in each case less than 5 V, and the auxiliary voltage U4 is in each case at least 5 V.

The capacitance of the capacitor 45 in the case of the flyback converters according to FIGS. 1 to 3 is expediently significantly less than the capacitance of the capacitor 32. This results in the auxiliary voltage U4 being built up earlier than the output voltage U2 to be regulated. This ensures the early supply of the regulator 72 according to FIG. 1 or of the reference element 86 and of the optocoupler diode 62 according to FIG. 2 at the start of the regulation process, as well as a sufficient voltage reserve for the regulation.

The comparatively high auxiliary voltage U4 furthermore enables independent and defined regulator characteristics.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A flyback converter, comprising:
   an electronic switch which is connected in series with a primary winding of a transformer in a main circuit on a primary side of the transformer, the electronic switch being controllable by a control device;
   on a secondary side of the transformer a main circuit which is connected to a secondary winding of the transformer, the main circuit having a first diode in a series path and an energy-storage capacitor in a subsequent parallel path, connected in parallel with an output in the transformer;
   a regulating arrangement connected to an output of the flyback converter, the regulating arrangement supplied with an auxiliary voltage, a duty ratio of the control voltage which controls the electronic switch being limited to a predetermined upper limit;
   an auxiliary circuit having an input connected to the first diode of the main circuit on the secondary side and the auxiliary circuit having one pole of an output connected to the input;
   the auxiliary circuit having an RC series circuit in a series path on the input side, a second diode in the downstream parallel path, a third diode in a series path following the parallel path, and a capacitor in parallel with the output;
   the regulating arrangement having an auxiliary voltage input supplied with an auxiliary voltage which is a sum of the output voltage of the flyback converter and the output voltage of the auxiliary circuit;
   the second diode polarized such that the second diode is reverse biased when the first diode is forward biased;
   the third diode polarized such that the third diode is reverse biased when the second diode is forward biased.

2. The circuit arrangement as claimed in claim 1, wherein a limit of the duty ratio is at least approximately 0.5.

3. The circuit arrangement as claimed in claim 1, wherein a zener diode is arranged in parallel with the output of the auxiliary circuit.

4. The circuit arrangement as claimed in claim 1, wherein the supply voltage input of a regulator of the regulating arrangement is connected to the auxiliary voltage input of the regulating arrangement.

5. The circuit arrangement as claimed in claim 1, wherein a light-emitting diode of an optocoupler is connected to the output of the regulating arrangement, and wherein a series circuit which has the light-emitting diode of the optocoupler and a resistor is connected to the auxiliary voltage input of the regulating arrangement.

6. The circuit arrangement as claimed in claim 1, wherein the regulator is formed by a reference element, and wherein the control voltage output of the reference element is connected via a resistor to the auxiliary voltage input of the regulating arrangement.

7. The circuit arrangement as claimed in claim 1, wherein an output voltage of the flyback converter is less than 5 V, and the auxiliary voltage is at least 5 V.

8. A flyback converter, comprising:
   an electronic switch which is connected in series with a primary winding of a transformer in a main circuit on a primary side of the transformer, the electronic switch being controllable by a control device;
   on a secondary side of the transformer a main circuit which is connected to a secondary winding of the transformer, the main circuit having a first diode in a series path and an energy-storage capacitor in a subsequent parallel path, connected in parallel with an output in the transformer;
   a regulating arrangement connected to an output of the flyback converter, the regulating arrangement supplied with an auxiliary voltage, a duty ratio of the control voltage which controls the electronic switch being limited to a predetermined upper limit;
   an auxiliary circuit having an input connected to the first diode of the main circuit on the secondary side and the auxiliary circuit having one pole of an output connected to the input;
   the auxiliary circuit having an RC series circuit in a series path on the input side, a second diode in the downstream parallel path, a third diode in a series path following the parallel path, and a capacitor in parallel with the output;
   the regulating arrangement having an auxiliary voltage input supplied with an auxiliary voltage which is a sum of the output voltage of the flyback converter and the output voltage of the auxiliary circuit;
   the second diode polarized such that the second diode is reverse biased when the first diode is forward biased;
   the third diode polarized such that the third diode is reverse biased when the second diode is forward biased; and
   a zener diode arranged in parallel with the output of the auxiliary circuit.

9. The circuit arrangement as claimed in claim 8, wherein a limit of the duty ratio is at least approximately 0.5.

10. The circuit arrangement as claimed in claim 8, wherein the supply voltage input of a regulator of the regulating arrangement is connected to the auxiliary voltage input of the regulating arrangement.

11. The circuit arrangement as claimed in claim 8, wherein a light-emitting diode of an optocoupler is connected tot he output of the regulating arrangement, and wherein a series circuit which has the light-emitting diode of the optocoupler and a resistor is connected to the auxiliary voltage input of the regulating arrangement.

12. The circuit arrangement as claimed in claim 8, wherein the regulator is formed by a reference element, and wherein the control voltage output of the reference element is connected via a resistor to the auxiliary voltage input of the regulating arrangement.

13. The circuit arrangement as claimed in claim 8, wherein an output voltage of the flyback converter is less than 5 V, and the auxiliary voltage is at least 5 V.

14. A flyback converter, comprising:
   an electronic switch which is connected in series with a primary winding of a transformer in a main circuit on a primary side of the transformer, the electronic switch being controllable by a control device;

on a secondary side of the transformer a main circuit which is connected to a secondary winding of the transformer, the main circuit having a first diode in a series path and an energy-storage capacitor in a subsequent parallel path, connected in parallel with an output in the transformer;

a regulating arrangement connected to an output of the flyback converter, the regulating arrangement supplied with an auxiliary voltage, a duty ratio of the control voltage which controls the electronic switch being limited to a predetermined upper limit;

an auxiliary circuit having an input connected to the first diode of the main circuit on the secondary side and the auxiliary circuit having one pole of an output connected to the input;

the auxiliary circuit having an RC series circuit in a series path on the input side, a second diode in the downstream parallel path, a third diode in a series path following the parallel path, and a capacitor in parallel with the output;

the regulating arrangement having an auxiliary voltage input supplied with an auxiliary voltage which is a sum of the output voltage of the flyback converter and the output voltage of the auxiliary circuit;

the second diode polarized such that the second diode is reverse biased when the first diode is forward biased;

the third diode polarized such that the third diode is reverse biased when the second diode is forward biased; and the supply voltage input of a regulator of the regulating arrangement connected to the auxiliary voltage input of the regulating arrangement.

15. The circuit arrangement as claimed in claim 14, wherein a limit of the duty ration is at least approximately 0.5.

16. The circuit arrangement as claimed in claim 14, wherein a zener diode is arranged in parallel with the output of the auxiliary circuit.

17. The circuit arrangement as claimed in claim 14, wherein a light-emitting diode of an optocoupler is connected tot he output of the regulating arrangement, and wherein a series circuit which has the light-emitting diode of the optocoupler and a resistor is connected to the auxiliary voltage input of the regulating arrangement.

18. The circuit arrangement as claimed in claim 14, wherein the regulator is formed by a reference element, and wherein the control voltage output of the reference element is connected via a resistor to the auxiliary voltage input of the regulating arrangement.

19. The circuit arrangement as claimed in claim 14, wherein an output voltage of the flyback converter is less than 5 V, and the auxiliary voltage is at least 5 V.

* * * * *